United States Patent
Bevan et al.

(10) Patent No.: US 12,524,929 B2
(45) Date of Patent: Jan. 13, 2026

(54) CONTENT GENERATION SYSTEM AND METHOD

(71) Applicant: Sony Interactive Entertainment Europe Limited, London (GB)

(72) Inventors: Matteo Bevan, Liverpool (GB); Phuong Anh Nguyen, London (GB)

(73) Assignee: SONY INTERACTIVE ENTERTAINMENT EUROPE LIMITED, London (GB)

( * ) Notice: Subject to any disclaimer, the term of this patent is extended or adjusted under 35 U.S.C. 154(b) by 148 days.

(21) Appl. No.: 18/584,314

(22) Filed: Feb. 22, 2024

(65) Prior Publication Data
US 2024/0290000 A1    Aug. 29, 2024

(30) Foreign Application Priority Data
Feb. 24, 2023   (GB) ...................................... 2302690

(51) Int. Cl.
*G06T 11/00*    (2006.01)
*G06F 3/01*    (2006.01)
*G06V 40/10*   (2022.01)

(52) U.S. Cl.
CPC ............. *G06T 11/00* (2013.01); *G06F 3/013* (2013.01); *G06F 3/017* (2013.01); *G06V 40/11* (2022.01)

(58) Field of Classification Search
CPC ..................................................... G06T 11/00
See application file for complete search history.

(56) References Cited

U.S. PATENT DOCUMENTS 9,383,895 B1    7/2016  Vinayak et al.
2012/0117514 A1  5/2012  Kim et al.
(Continued)

OTHER PUBLICATIONS

Extended European Search Report including Written Opinion for Application No. 24154801.5 dated Jul. 8, 2024, pp. 1-7.
(Continued)

*Primary Examiner* — Shivang I Patel
(74) *Attorney, Agent, or Firm* — Kilpatrick Townsend & Stockton LLP (57) ABSTRACT

An image generation system operable to generate updated views of an object in a scene, the system comprising an input obtaining unit configured to obtain one or more user inputs for controlling the pose of the object, an object pose modification unit configured to determine an updated pose of the object in accordance with the obtained user inputs, a hand pose determination unit configured to determine a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands, a grab pose determination unit configured to determine a grab pose for each of the hands, the grab pose comprising a pose for fingers of each of the hands determined in dependence upon the updated object pose and a corresponding hand pose, and a rendering unit configured to generate one or more images of the object and associated hands in dependence upon the determined poses of the object, hands, and fingers.

14 Claims, 4 Drawing Sheets

(56) References Cited

U.S. PATENT DOCUMENTS

2017/0329488 A1    11/2017  Welker et al.
2020/0004403 A1*   1/2020   Holz ...................... G06F 3/017
2021/0019036 A1*   1/2021   Wang .................... G06F 3/0346
2022/0206298 A1*   6/2022   Goodman ............... G06F 3/011

OTHER PUBLICATIONS

Great Britain Search Report for Application No. 2302690.9 dated Aug. 23, 2023, 1 page.

* cited by examiner

CONTENT GENERATION SYSTEM AND METHOD

CROSS-REFERENCE TO RELATED APPLICATIONS

The present application claims priority from Great Britain Patent Application No. 2302690.9 filed on Feb. 24, 2023, the disclosure of which is hereby incorporated herein by reference.

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As technology has advanced over the years there has been an increased demand for and desire to supply immersive experiences for users of interactive content such as video games. To date this has largely been realised through the provision of content having improved graphics and audio, as well as the provision of improved peripherals to enable a more intuitive interaction (or indeed the provision of peripheral-free interactions such as gesture-controlled content).

Another area in which improvements have been observed is that of software; for instance, improvements to computer-controlled enemies in games or other non-player characters can lead to improved immersion for a user as their behaviour becomes closer to that of a human player. Similarly, the interactivity of virtual environments and the like have been improved which can lead to a user being able to interact in a more natural manner, for instance due to encountering fewer restrictions upon their behaviour.

However, it is considered that such improvements to the immersiveness of content come with a cost or drawbacks. This may be in the requirement for additional hardware elements (such as new controllers or cameras), or in the fact that such improvements may require the dedication of additional processing resources. This can mean that either a more powerful processing device is required, or other aspects of the content to be scaled back to account for the additional processing demands of immersion-improving processes.

It is therefore considered that there is a demand for systems and methods which improve the level of immersion associated with content without a significant implementation burden.

SUMMARY OF THE INVENTION

This disclosure is defined by claim 1. Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present disclosure are described.

Figure 1:
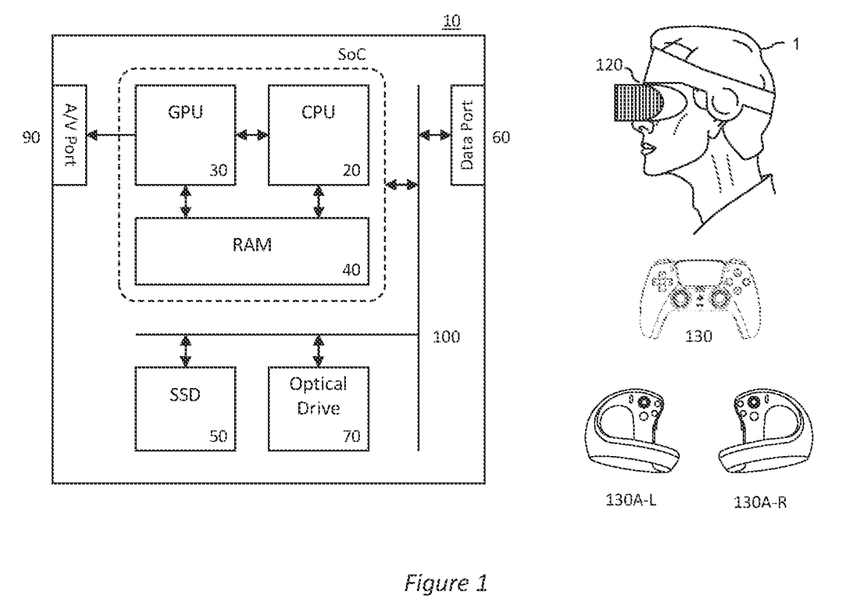
FIG. 1 schematically illustrates an exemplary entertainment system.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment system is a head mounted display 'HMD' 120, such as the PlayStation VR 2 'PSVR2', worn by a user 1. Alternatively, or in addition, one or more displays such as televisions may be used to display images output by the entertainment system.

Where components are not integrated, they may be connected as appropriate either by a dedicated data link or via a bus 100.

Interaction with the system is typically provided using one or more handheld controllers (130, 130A), such as the DualSense® controller (130) in the case of the PS5, and/or one or more VR controllers (130A-L,R) in the case of the HMD.

In order to provide an immersive user experience, it may be considered advantageous that a user is able to interact with objects in a natural and unconstrained manner (or at least within the constraints imposed by the physics of a virtual environment or the like). One example of an interaction in which deficiencies are observed in the prior art is in that of examining an object that is held by the user. Here, 'examination' refers to the ability of a user to inspect an object from a range of different angles; this may be advantageous in that is can enable a user to identify details of the object which are hidden in the default view. Existing arrangements may fail to provide such an immersive interaction for any of a number of reasons; it may be that the user is not able to obtain views of the object from particular angles, for instance, or the representation of the user's hands may not grip the object in a realistic manner (or indeed, at all).

One approach that may be adopted in existing arrangements is that of a scripted examination of an object. In response to a user input or another cue (such as the initial picking up of an object), a predefined examination of the object is executed. This may include the use of predefined views of an object as well as movement of the hands of an avatar holding the object. While this may provide a useful examination of the object, this is not responsive to user inputs (for instance, the user is not able to select a particular view to inspect) and requires a significant investment in terms of the animation of that sequence. Other arrangements have proposed alternative implementations of an inspection; some may enable a user to flip an object by pressing a button so as to view the rear of an object, while others may open a new interface which enables an inspection of the object outside of the virtual environment (such as a specific object inspection GUI).

Figure 2:
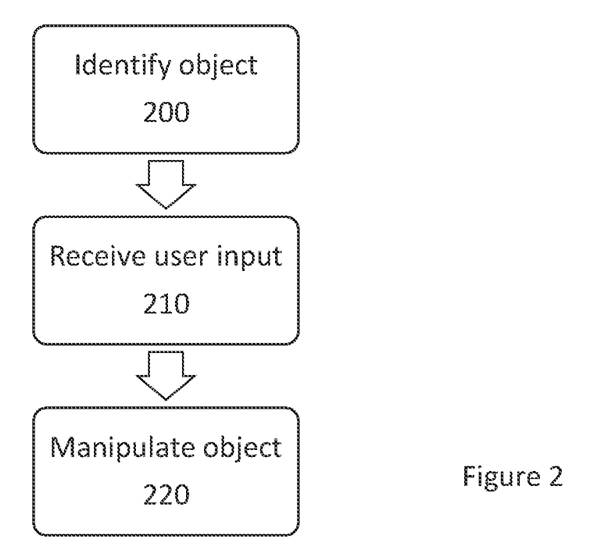
FIG. 2 schematically illustrates a method for providing an immersive examination of an object.

FIG. 2 schematically illustrates a method for providing an immersive examination of an object in an efficient and effective manner.

A step 200 comprises identifying an object to be examined. This may be an object that is held by a user's character within a game, for instance, or any other object that is able to be manipulated—for example, a globe may be an object that is able to be manipulated whilst not being held. The identification of the object may further include the obtaining of any corresponding data about that object; this may include texture and/or mesh information, for instance, and/or the identification of a pose of the object or any other parameters representing the state of the object in the virtual environment.

A step 210 comprises receiving a user input indicating a manipulation of the identified object. This input may be provided using any suitable method; examples include gesture-based inputs (such as via motion tracking of a user) and controller-based inputs such as using joysticks, trackpads, or buttons. These inputs are indicative of at least a rotation of the object so as to enable an examination of the object by the user.

A step 220 comprises manipulation of the identified object in accordance with the received user input, with the manipulation being represented by a movement of virtual hands (or other virtual limbs) associated with the object; these may be hands of a user's virtual avatar, for instance. This manipulation includes a change in orientation of the object, and may further include a change of position of the object (such as if a user rotates the object whilst also moving it nearer to the camera for a close-up view).

Figure 3:
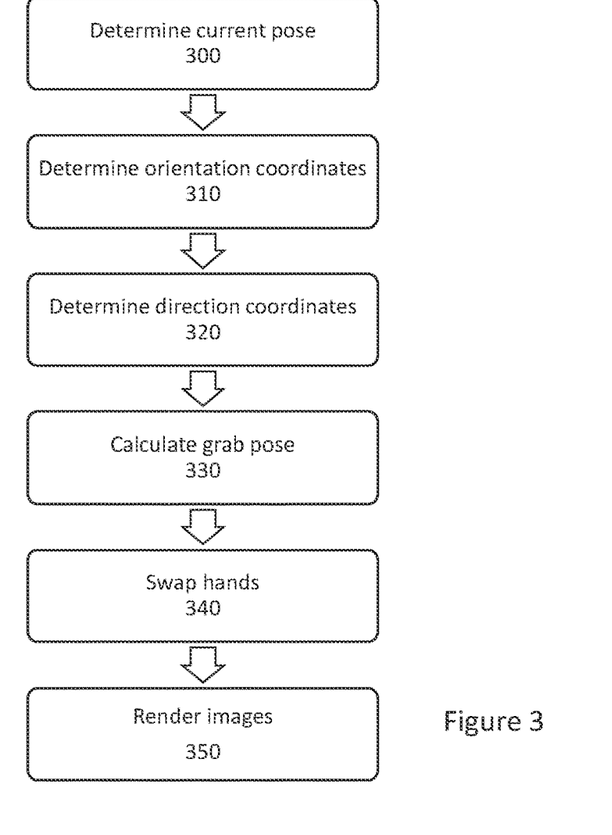
FIG. 3 schematically illustrates a method for generating images of an object examination.

FIG. 3 provides a more detailed schematic illustration of a method for implementing step 220 as described above. The steps of this method are exemplary, with these (and any other) steps being performed optionally for a given implementation of this method. The order of the steps shown in FIG. 3 are entirely exemplary, with the order able to be modified as appropriate; indeed, in some cases the steps may be performed substantially simultaneously (such as determining both sets of coordinates, steps 310 and 320, at the same time). It is considered that the method of FIG. 3 may be performed in an iterative manner, such that the pose of the object and the hands are updated with any suitable frequency.

A step 300 comprises determining the current pose of the identified object (that is, the object identified in step 200 of FIG. 2) and updating the pose of the object in accordance with the received input. The current, or start, pose may be represented using any suitable coordinate system. This start pose may be entirely arbitrary, for instance defined in response to user inputs, or it may be a predetermined start pose for the object such as a default holding position for the object. In the latter case, the object and/or hands may be returned to this start pose after any examination of the object by the user.

Once identified, the start pose may be mapped into a blend space; that is, a two-dimensional coordinate system which is specifically used to represent different poses of the hands that are holding the object. An example of such a space is shown in FIG. 4, with FIG. 5 showing such a space with appropriate arrangements of the user's hands (with a correspondingly-orientated object being held) as an example of the mapping of the space.

Figure 4:
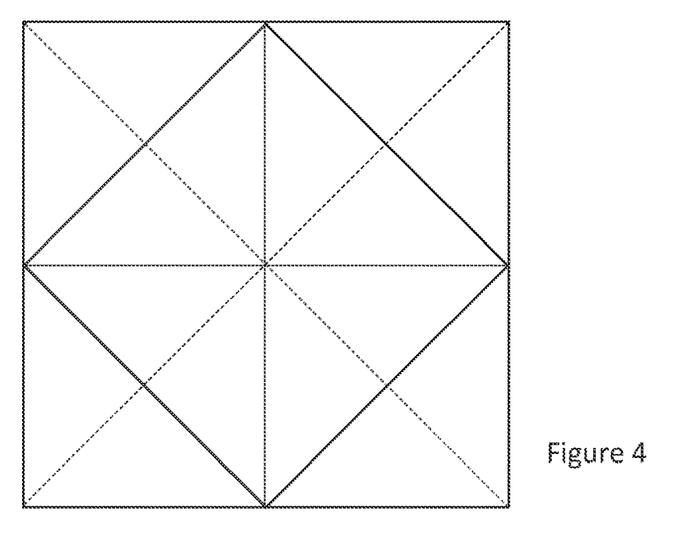
FIGS. 4-6 schematically illustrate blend spaces, with FIG. 5 also illustrating examples of reference views of an object.
Figure 5:
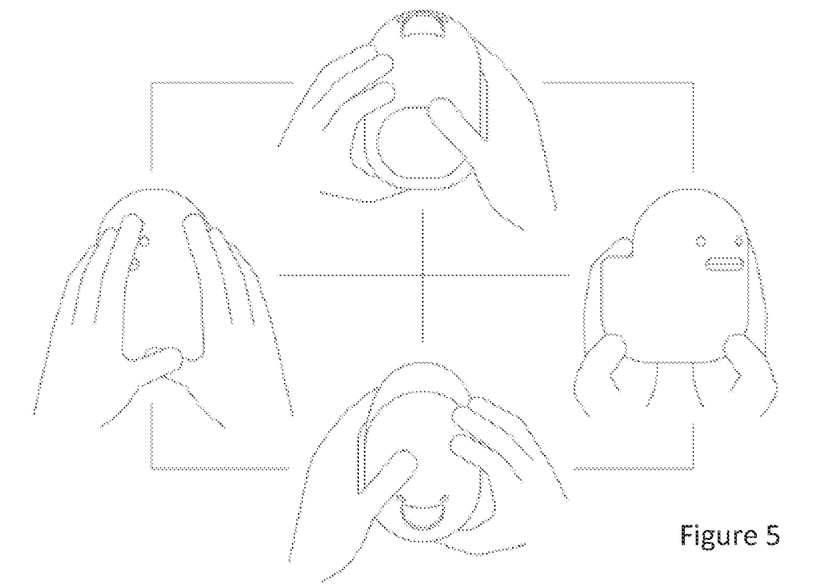

The blend space of FIGS. 4 and 5 is a two-dimensional representation of the pose of the user's hands (that is, user-controlled virtual representations of hands) in response to user inputs controlling the examination of the object. The pose may include both hands as a single reference pose, or the pose may be defined for each hand separately; in the latter case, this can enable the interpolation between poses to be performed for each hand separately, which can enable a greater flexibility and/or simplified process. However, in many cases the reference poses may be supplied for the hands as a pair as the positions are in many cases dependent upon one another when coordinating to hold an object in a particular pose.

In FIG. 5, the images of the user's hands include an object being held-however this is not necessary, and in some implementations the position of the hands may be shown in the blend space without an object being held. This may be simulated by having the hands handling a transparent object, for example, or by defining the hand positions/orientations without reference to an object at all. Alternatively, the blend space may be defined for each object within a game (or at least a plurality of objects having a range of shapes which can be used as references for specific objects within the game) or other content. For instance, rather than defining a different blend space for each spherical object in a game it may be considered sufficient to define a respective blend space for each a small number of reference spherical objects of different sizes; the spherical objects can then utilise a blend space corresponding to the most-similar of the reference spherical objects.

The vertical coordinate of the blend space is representative of a rotation about a horizontal axis of the object (the pitch of the object), while the horizontal coordinate of the blend space is representative of a rotation about a vertical axis of the object (the yaw of the object). The blend space is defined by examples of the appearance of the user's hands at the extent of each of these rotations; this is shown in FIG. 5 by the four views that are shown at respective positions within the blend space. These views do not represent the full extent of motion of the object, but instead illustrate the hand positions/orientations corresponding to motion of the object, in which any additional motion of the object beyond the boundary would lead to a hand swap being performed so as to maintain realistic hand positions/orientations. Those poses which are at the extent of the blend space are referred to as boundary views below, and are considered to represent reference poses for the hands at different locations within the blend space.

In some implementations it is considered that the reference views of the hands are not provided so as to be representative of the full physical range of motion of the hands, and that instead the reference views may represent a partial rotation (such as twenty or thirty degrees to the left/right of the boundary space) rather than a full rotation in that direction (closer to ninety degrees, as limited by the range of motion of the wrist). Any suitable value may be selected, with values in the range of forty to sixty degrees being preferable in many cases as this may represent a movement of the user's hands that appears natural (and therefore realistic, aiding with the immersion of the content). These reference views provide sufficient visual information for the generation of views for arbitrary poses of the hands throughout the blend space using interpolation or procedural generation.

The internal lines shown in the blend space of FIG. 4 represent a selection of paths that may be taken during the examination of the object. These may be defined to correspond to the inputs that are able to be provided by a particular input device, for instance, or may be defined arbitrarily as appropriate for a given implementation; in some embodiments, the paths may represent the most direct routes between the boundary views. Even if such paths are defined, there may be no requirement for the examination to follow these paths—the user may be able to provide inputs that enable the examination to lead to any orientation of the object being examined.

While four views are shown in FIG. 5, it is considered that other views of the hands may be provided at other positions on the boundary of the blend space (the other views having a correct pose corresponding to that position in the blend space). For instance, another view of the hand in the top right corner of the blend space should be a view of the hands with a maximum rotation for the pitch and yaw directions; the bottom and right of the object should therefore be visible as a result of this rotation, in accordance with the parts of the object visible in the respective top and right views.

The new position of the object may also be defined within the blend space based upon the input received from the user. The view of the hands is then derived by procedurally generating or interpolating a representation of the hands based upon the views defined at the boundary of the blend space; the particular view of the object is typically derived from a stored model of the object, such as from game assets or the like, although an interpolation or procedural generation process or the like may also be considered suitable.

A step 310 comprises determining orientation coordinates for the 'parent hand' in dependence upon the received inputs from the user; the parent hand is generally considered to be the hand which is holding the object. In some cases it may be considered that both hands are holding the object, in which case the parent hand may be selected based upon any suitable parameters-such as a grab pose (discussed below) or the current orientation of the hand/object. Suitable parameters may be any which are indicative of the level of grip of a hand upon an object, for instance, in which case the hand having the highest grip level may be defined as the parent hand.

The orientation coordinates define the final pose for the parent hand based upon the inputs received from a user; in other words, the inputs from the user are to be used to determine how much the parent hand moves to correspond to the rotation of the object. These coordinates may be representative of a vector from the start pose to the current pose of the object, and may be obtained by summing the input vectors (that is, vectors representing the direction and magnitude of inputs by the user) throughout the examination process. The pose for the parent hand is then derived using the orientation coordinates by interpolating between boundary views of the hands in dependence upon the coordinates in the blend space. Of course, alternatives to interpolation may also be considered, such as the procedural generation (which may be weighted or otherwise dependent upon the coordinates).

A step 320 comprises determining direction coordinates for the free hand. These coordinates derived by interpolating the orientation coordinates (determined in step 310) and the direction vector defined by the inputs provided by the user. This leads to the determination of a position for the free hand which is linked to that of the parent hand, which can avoid an unnatural positioning of the hands relative to one another. The pose for the free hand is determined in the same manner as that of the parent hand, instead utilising the direction coordinates rather than the orientation coordinates.

Of course, any other alternative method of determining the coordinates for the free hand may be used—examples include the generation of coordinates based solely on user inputs or the state of the parent hand, or based upon the proximity of a surface of the object being examined.

In many cases, the left and the right hand may move in opposite directions to one another; this is another reason as to why the independent calculation of the respective orientation and direction coordinates may be considered advantageous. For instance, considering moving from the top boundary pose to the bottom boundary pose in FIG. 5, it is noted that the right hand has rotated towards the user while the left hand has rotated away from the user. Similarly, the left and right boundary poses in FIG. 5 represent opposite rotations in that both hands rotate inwards (towards one another) or outwards (away from one another) as appropriate.

A step 330 comprises calculating a grab pose for each of the hands holding the object. The determination of the grab pose is based upon an interpolation between a predefined open hand pose and a predefined closed hand pose; the interpolation is performed by considering each of the bones of the fingers belonging to each hand as a separate entity, and by iteratively performing a collision detection process for each of the bones. In this case, the boundary poses and the coordinates of steps 310 and 320 are used to identify the hand location/orientation rather than the individual finger positions. Alternatively, the predefined open hand pose may instead use the finger positions as shown in the boundary poses as a starting point for the interpolation; in this case the finger positions of the boundary poses would then be utilised.

The pose of the fingers associated with each hand are therefore determined on the basis of contact between the fingers and the object, with the relationship between the bones being used to determine a pose for the hand outside of those which directly contact the object. The open and closed hand poses can be defined for a particular character or user, for example, and/or for a particular object—defining object-specific open/closed hand poses may lead to the interpolated grab pose being more suitable (that is, realistic or natural) for that object.

A step 340 comprises the performing of a hand swap when corresponding conditions for doing so are met; in other words, it is determined whether the object should be transferred from the parent hand to the free hand. This is performed when the inputs by the user cause the motion of the object to reach the boundary of the blend space. The size of the blend space (that is, the distance of the blend space boundaries relative to the origin) may be defined responsive to any suitable parameters; in some implementations limits upon joint movement may be considered, for instance. Alternatively, or in addition, user preferences, pose change thresholds (which may be defined within the blend space, or may correspond to the boundaries of the blend space), and/or object-specific parameters (such as those defined based upon how best to hold a particular object, for instance based upon a handle on the object) may be considered.

In the case that a hand swap is performed, the hand to which the object is attached is switched. This leads to a corresponding redefining of the 'parent' and 'free' hands, or a reassignment of the orientation coordinates and direction coordinates to the other of the hands.

A step 350 comprises rendering images of the hands and the object being held in accordance with the parameters determined in the preceding steps. This may be performed in accordance with any suitable rendering process as appropriate for a given implementation; of course, this may form a part of the rendering of a virtual environment in which the object and hands are present.

In the case of a completely free examination process, it is considered likely that the user would provide inputs causing the object's rotation to continue in a particular direction despite the boundary of the blend space being reached. For instance, if a user continually rotated the object vertically they would expect to loop back to the start pose; they would not expect to be limited in the exploration to the boundary view in the corresponding direction with no further examination in that direction allowed. In response to reaching the boundary of the blend space, as discussed above, a hand swap is performed—that is, the parent hand becomes the new free hand and the free hand becomes the new parent hand. In addition to this, the direction of the input is reversed when generating a new blend space coordinate; in other words, the same rotation of the object causes an opposite change in the blend space coordinates. This reflects that the hands would have to move in the opposite direction to that in which they were previously moving to maintain the manipulation of the object.

Figure 6:
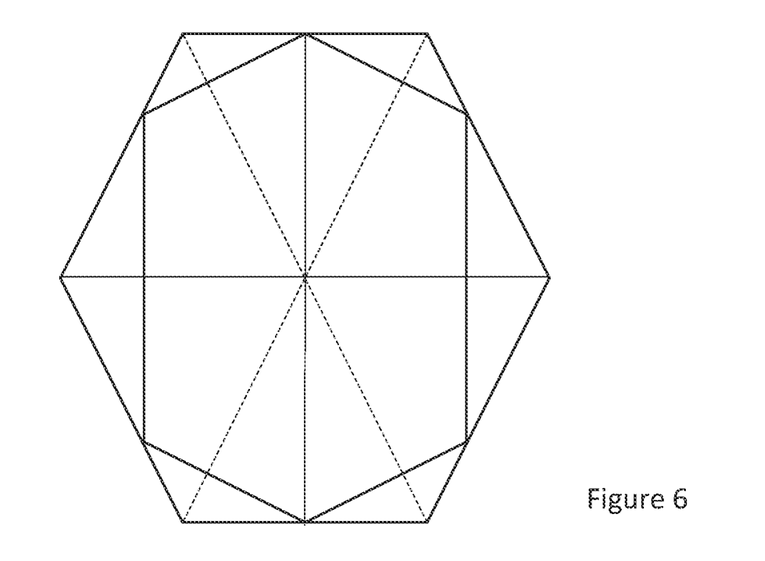

FIG. 6 schematically illustrates an alternative implementation of the blend space as discussed above. In particular, this is an example of an octagonal blend space rather than a square space. The same coordinate system may be used to represent locations within the blend space, but the modified shape may be more suitable for representing hand poses for the handling of some objects due to the different boundary cases that would be represented. In other words, the blend space of FIG. 6 may be used to offer a more diverse range of hand poses due to the more complex boundary shape—this may be more appropriate for the examination of complex objects, such as those with a surface comprising a number of recesses and the like which may require more specialised handling by a user.

The example of FIG. 6 is purely exemplary, in that any suitable shape may be used to represent the blend space; the shape may be selected freely for the particular object being handled and/or a particular user. For instance, a circular blend space may be preferred in some embodiments as in such a case the boundary of the blend space is a constant distance from the centre (and as such a mapping of rotations to blend space coordinates may be simplified in some instances).

It is not considered that the blend space need be symmetric about the origin; a person may have different ranges of motion for different joints, which can lead to different ranges of motion for each hand and a blend space may be defined to reflect this. This can lead to blend spaces which are rectangular, for instance, or to a scaling being applied to motion vectors in dependence upon the direction of the input motion. This can enable the blend space boundary to be reached at different amounts of rotation for different directions without modifying the basic shape of the blend space.

Figure 7:
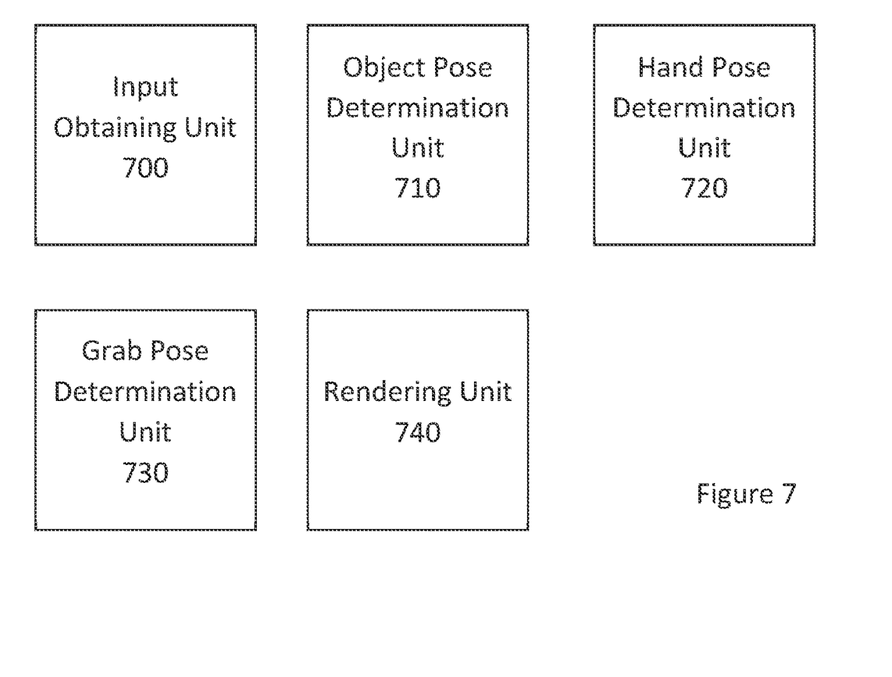
FIG. 7 schematically illustrates an image generation system operable to generate updated views of an object in a scene.

FIG. 7 schematically illustrates an image generation system operable to generate updated views of an object in a scene. The system comprises an input obtaining unit 700, an object pose modification unit 710, a hand pose determination unit 720, a grab pose determination unit 730, and a rendering unit 740. Each of these functional units may be implemented using any suitable processing hardware, such as one or more CPUs and GPUs (for instance the CPU 20 and GPU 30 of FIG. 1) in any suitable combination; this processing hardware may be providing within a single device or the functionality may be distributed amongst a number of devices, such as a games console performing processing with the rendering being performed at a display device, or processing being split between a remote server and a local processing device.

The input obtaining unit 700 is configured to obtain one or more user inputs for controlling the pose of the object. The user inputs may be provided in any suitable manner, such as via controllers, gesture-based inputs, or any other input; the only requirement is that the inputs are sufficient to indicate an intended rotation of the object so as to perform an examination of the object by generating views of the object from different angles. In some embodiments the inputs may therefore comprise one or more operations of a control device, gestures, voice commands, and/or gaze inputs.

The object pose modification unit 710 is configured to determine an updated pose of the object in accordance with the obtained user inputs The object pose modification may be performed in accordance with the discussion of step 300 of FIG. 3.

The hand pose determination unit 720 is configured to determine a pose for each of the hands associated with the object in accordance with the obtained user inputs, in which the determining comprises generating a corresponding representation of the hands with the respective determined poses based upon two or more reference views of the hands, the reference views corresponding to different respective poses of the hands. The reference views are views of the hands from other angles, such as those discussed with reference to the example FIG. 5. This determination may be performed in accordance with steps 310 and 320 of FIG. 3 as described above, for example, so as to determine the orientation coordinates and direction coordinates for respective ones of the hands associated with the object being examined.

In some implementations, only a pair of reference views may be provided; for instance, if the examination of an object is constrained to a single axis (such as spinning a globe, which has a predetermined axis of rotation). In other cases, the two or more reference views are selected from a larger plurality of reference views of the hands; this larger plurality may be any number, such as four as shown in the example discussed with reference to FIG. 5. There is no limit to the number of reference views that may be provided, although it is recognised that an increased number of reference views may lead to a decreased benefit being obtained from implementations of the present disclosure due to an increased storage burden associated with the additional reference views.

In some implementations the hand pose modification unit is configured to generate the corresponding representation using an interpolation between the two or more reference views of the hands in accordance with the determined poses and the respective poses of the hands in the reference views. Such an approach may be particularly suitable in the case in which a larger number of reference views are provided This is because each of the reference views in this case would be seen to comprise a high amount of the required information for generating the new view.

Alternatively, the hand pose modification unit 720 may be configured to generate the corresponding representation using a procedural generation process in dependence upon the two or more reference views of the hands and the determined poses. Any suitable procedural generation process may be used, with the process optionally being tailored to a particular object or class of object to improve the reliability or efficiency of the process.

The discussed interpolation or procedural generation based upon the reference views may be performed based upon the appearances of the hands in those views; alternatively, or in addition, a pose of the hand (optionally including the individual fingers) may be determined and this pose information may be used for the interpolation/procedural generation.

A first hand may be designated as the hand holding the object while a second hand may be designated as a free hand, wherein the pose of the first hand is determined to remain in constant contact with the object. This designation of the hands can then be changed in response to one or more conditions relating to the hands and/or objects being satisfied, thereby leading to an apparent hand switch for the object. This may be performed so as to increase the level of realism of the action, for instance, as there are limits on the range of motion of the human wrist. The one or more conditions may include a threshold object rotation about a particular axis, for example, or any of the other considerations discussed with reference to step 340 of FIG. 3. For example, the switching of the designations of the hands may be performed in response to the receiving of inputs corresponding to a motion that would exceed the boundaries of the blend space.

The pose for the second hand may be determined by interpolating between a vector defined by user inputs and a vector corresponding to the pose of the first hand, as discussed above, although other methods for determining the pose of the second hand may be considered (such as varying the position with respect to the object, or only the pose of the first hand).

It is considered that in some implementations each of the hand poses, and optionally the object poses, may defined in a two-dimensional blend space which represents each of the possible poses of the hands; that is, a space as discussed with reference to FIGS. 4-6 described above. In other words, the blend space may be any bounded two-dimensional coordinate space in which the coordinates are mapped to the range of motion of the hands.

The grab pose determination unit 730 is configured to determine a grab pose for each of the hands, the grab pose comprising a pose for fingers of each of the hands determined in dependence upon the updated object pose and a corresponding hand pose; this is discussed in more detail above with reference to step 330 of FIG. 3. The grab pose therefore represents the pose of the fingers of each of the hands in respect of their interaction with the surface of the object; this pose is therefore used to generate a finger position that appears realistic for holding the object being examined. The grab pose may be determined by interpolating between reference hand positions indicating respective finger locations for an open hand position and a closed hand position (optionally along with the hierarchical structure discussed with reference to step 330 of FIG. 3), although other approaches may be utilised for determining an appropriate finger position with respect to the object.

The rendering unit 740 is configured to generate one or more images of the object and associated hands in dependence upon the determined poses of the object, hands, and fingers. In other words, the rendering unit 740 is configured to generate images for display by an image output unit (such as a television or HMD) comprising the object and the hands associated with the object.

The arrangement of FIG. 7 is an example of a processor (for example, a GPU and/or CPU located in a games console or any other computing device) that is operable to generate updated views of an object in a scene, and in particular is operable to:

obtain one or more user inputs for controlling the pose of the object;

determine an updated pose of the object in accordance with the obtained user inputs;

determine a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;

determine a grab pose for each of the hands, the grab pose comprising a pose for fingers of each of the hands determined in dependence upon the updated object pose and a corresponding hand pose; and generate one or more images of the object and associated hands in dependence upon the determined poses of the object, hands, and fingers.

An example of a hardware device that is suitable for providing such functionality is the entertainment device 10 of FIG. 1, wherein the CPU 20 and/or the GPU 30 may be utilised as appropriate to perform the processing steps described. Similar processing elements may also be provided in other devices or hardware arrangements, and may optionally be distributed amongst a number of such devices or arrangements.

Figure 8:
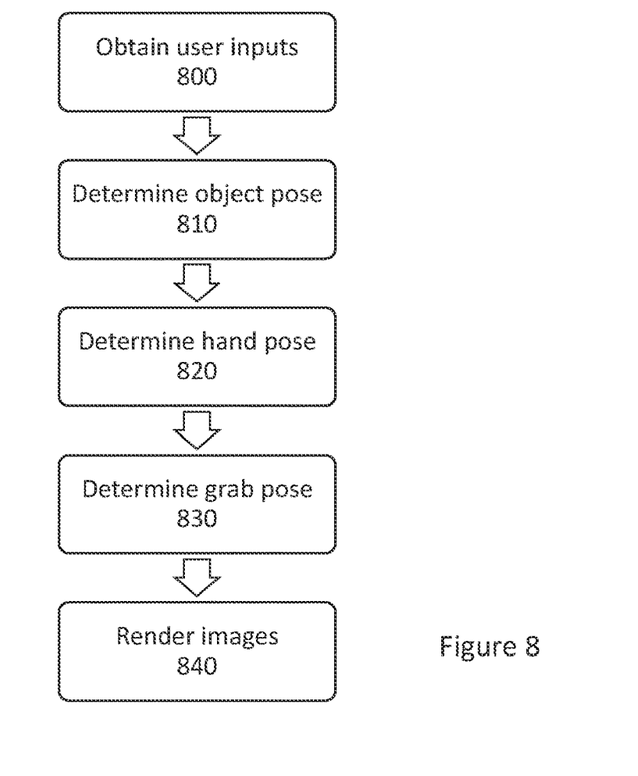
FIG. 8 schematically illustrates a method for generating updated views of an object in a scene.

FIG. 8 schematically illustrates a method for generating updated views of an object in a scene. Steps of this method may be performed in accordance with the discussion of corresponding steps of the method of FIG. 3, and the discussion of FIG. 7.

A step 800 comprises obtaining one or more user inputs for controlling the pose of the object.

A step 810 comprises determining an updated pose of the object in accordance with the obtained user inputs.

A step 820 comprises determining a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands.

A step 830 comprises determining a grab pose for each of the hands, the grab pose comprising a pose for fingers of each of the hands determined in dependence upon the updated object pose and a corresponding hand pose.

A step 840 comprises generating one or more images of the object and associated hands in dependence upon the determined poses of the object, hands, and fingers.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. An image generation system operable to generate updated views of an object in a scene, the system comprising:
   an input obtaining unit configured to obtain one or more user inputs for controlling the pose of the object;
   an object pose modification unit configured to determine an updated pose of the object in accordance with the obtained user inputs;
   a hand pose determination unit configured to determine a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;
   a grab pose determination unit configured to determine a grab pose for each of the hands, the grab pose comprising a pose for fingers of each of the hands determined in dependence upon the updated object pose and a corresponding hand pose; and
   a rendering unit configured to generate one or more images of the object and associated hands in dependence upon the determined poses of the object, hands, and fingers.
2. A system according to clause 1, wherein the two or more reference views are selected from a larger plurality of reference views of the hands.
3. A system according to clause 2, wherein the larger plurality of reference views is four views.
4. A system according to any preceding clause, wherein the hand pose modification unit is configured to generate the corresponding representation using an interpolation between the two or more reference views of the hands in accordance with the determined poses and the respective poses of the hands in the reference views.
5. A system according to any of clauses 1-3, wherein the hand pose modification unit is configured to generate the corresponding representation using a procedural generation process in dependence upon the two or more reference views of the hands and the determined poses.
6. A system according to any preceding clause, wherein each of the hand poses are defined in a two-dimensional blend space which represents each of the possible poses of the hands.
7. A system according to any preceding clause, wherein the grab pose is determined by interpolating between reference hand positions indicating respective finger locations for an open hand position and a closed hand position.
8. A system according to any preceding clause, wherein a first hand is designated as the hand holding the object and a second hand is designated as a free hand, and wherein the pose of the first hand is determined to remain in constant contact with the object.
9. A system according to clause 8, wherein the designation of the hands is changed in response to one or more conditions relating to the hands and/or objects being satisfied.
10. A system according to clause 9, wherein the one or more conditions include a threshold object rotation about a particular axis.
11. A system according to any of clauses 8-10, wherein the pose for the second hand is determined by interpolating between a vector defined by user inputs and a vector corresponding to the pose of the first hand.
12. A system according to any preceding clause, wherein the user inputs comprise one or more operations of a control device, gestures, voice commands, and/or gaze inputs.
13. A method for generating updated views of an object in a scene, the method comprising:
   obtaining one or more user inputs for controlling the pose of the object;
   determining an updated pose of the object in accordance with the obtained user inputs;
   determining a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;
   determining a grab pose for each of the hands, the grab pose comprising a pose for fingers of each of the hands determined in dependence upon the updated object pose and a corresponding hand pose; and generating one or more images of the object and associated hands in dependence upon the determined poses of the object, hands, and fingers.

14. Computer software which, when executed by a computer, causes the computer to carry out the method of clause 13.

15. A non-transitory machine-readable storage medium which stores computer software according to clause 14.

The invention claimed is:

1. An image generation system operable to generate updated views of an object in a scene, the system comprising:
    an input obtaining unit configured to obtain one or more user inputs for controlling the pose of the object;
    an object pose modification unit configured to determine an updated pose of the object in accordance with the obtained user inputs;
    a hand pose determination unit configured to determine a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;
    a grab pose determination unit configured to determine a grab pose for each of the hands, the grab pose comprising a pose for fingers of each of the hands determined in dependence upon the updated object pose and a corresponding hand pose; and
    a rendering unit configured to generate one or more images of the object and associated hands in dependence upon the determined poses of the object, hands, and fingers.

2. The system of claim 1, wherein the two or more reference views are selected from a larger plurality of reference views of the hands.

3. The system of claim 2, wherein the larger plurality of reference views is four views.

4. The system of claim 1, wherein the hand pose modification unit is configured to generate the corresponding representation using an interpolation between the two or more reference views of the hands in accordance with the determined poses and the respective poses of the hands in the reference views.

5. The system of claim 1, wherein the hand pose modification unit is configured to generate the corresponding representation using a procedural generation process in dependence upon the two or more reference views of the hands and the determined poses.

6. The system of claim 1, wherein each of the hand poses are defined in a two-dimensional blend space which represents each of the possible poses of the hands.

7. The system of claim 1, wherein the grab pose is determined by interpolating between reference hand positions indicating respective finger locations for an open hand position and a closed hand position.

8. The system of claim 1, wherein a first hand is designated as the hand holding the object and a second hand is designated as a free hand, and wherein the pose of the first hand is determined to remain in constant contact with the object.

9. The system of claim 8, wherein the designation of the hands is changed in response to one or more conditions relating to the hands and/or objects being satisfied.

10. The system of claim 9, wherein the one or more conditions include a threshold object rotation about a particular axis.

11. The system of claim 8, wherein the pose for the second hand is determined by interpolating between a vector defined by user inputs and a vector corresponding to the pose of the first hand.

12. The system of claim 1, wherein the user inputs comprise one or more operations of a control device, gestures, voice commands, and/or gaze inputs.

13. A method for generating updated views of an object in a scene, the method comprising:
    obtaining one or more user inputs for controlling the pose of the object;
    determining an updated pose of the object in accordance with the obtained user inputs;
    determining a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;
    determining a grab pose for each of the hands, the grab pose comprising a pose for fingers of each of the hands determined in dependence upon the updated object pose and a corresponding hand pose; and
    generating one or more images of the object and associated hands in dependence upon the determined poses of the object, hands, and fingers.

14. A non-transitory machine-readable storage medium which stores computer software which, when executed by a computer, causes the computer to perform a method for generating updated views of an object in a scene, the method comprising:
    obtaining one or more user inputs for controlling the pose of the object;
    determining an updated pose of the object in accordance with the obtained user inputs;
    determining a pose for each of the hands associated with the object in accordance with the obtained user inputs, wherein the determining comprises generating a corresponding representation of the hands with the respective determined poses based upon two or more reference views of the hands, the reference views corresponding to different respective poses of the hands;
    determining a grab pose for each of the hands, the grab pose comprising a pose for fingers of each of the hands determined in dependence upon the updated object pose and a corresponding hand pose; and
    generating one or more images of the object and associated hands in dependence upon the determined poses of the object, hands, and fingers.

* * * * *